Feb. 28, 1933.  H. BASCOM  1,899,074
DISPLAY APPARATUS
Filed Nov. 14, 1931   4 Sheets-Sheet 1
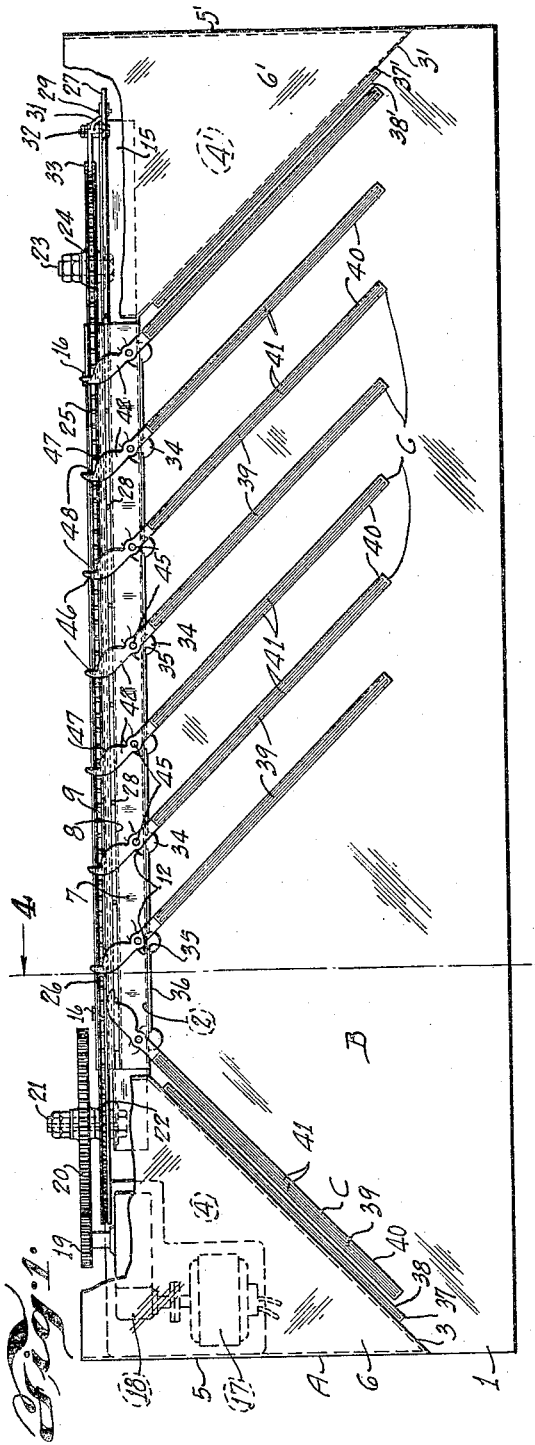
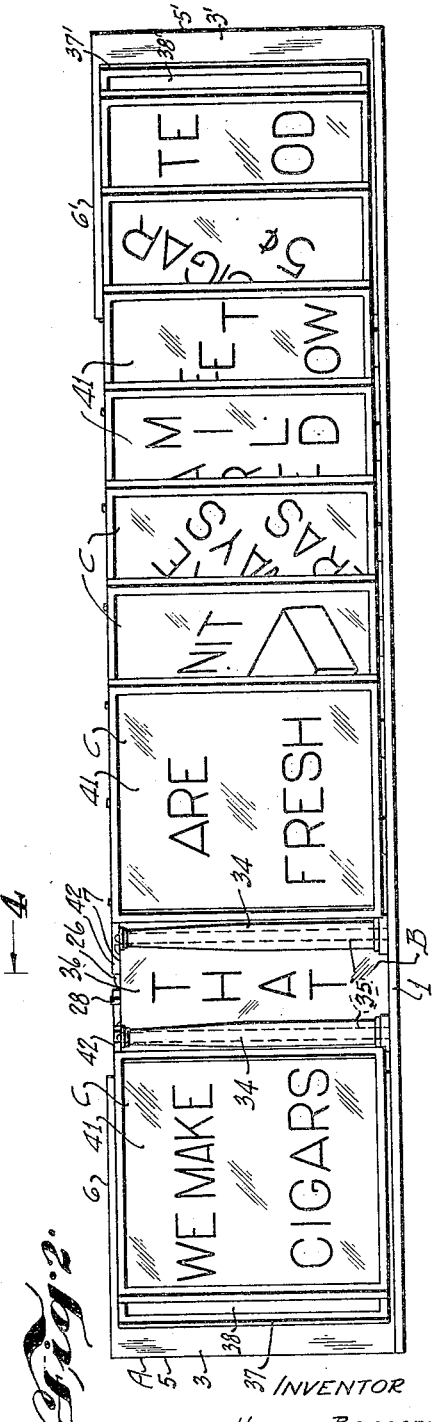
INVENTOR
Henry Bascom.
By *Ralph Steen*
ATTORNEY Feb. 28, 1933.  H. BASCOM  1,899,074
DISPLAY APPARATUS
Filed Nov. 14, 1931   4 Sheets-Sheet 2
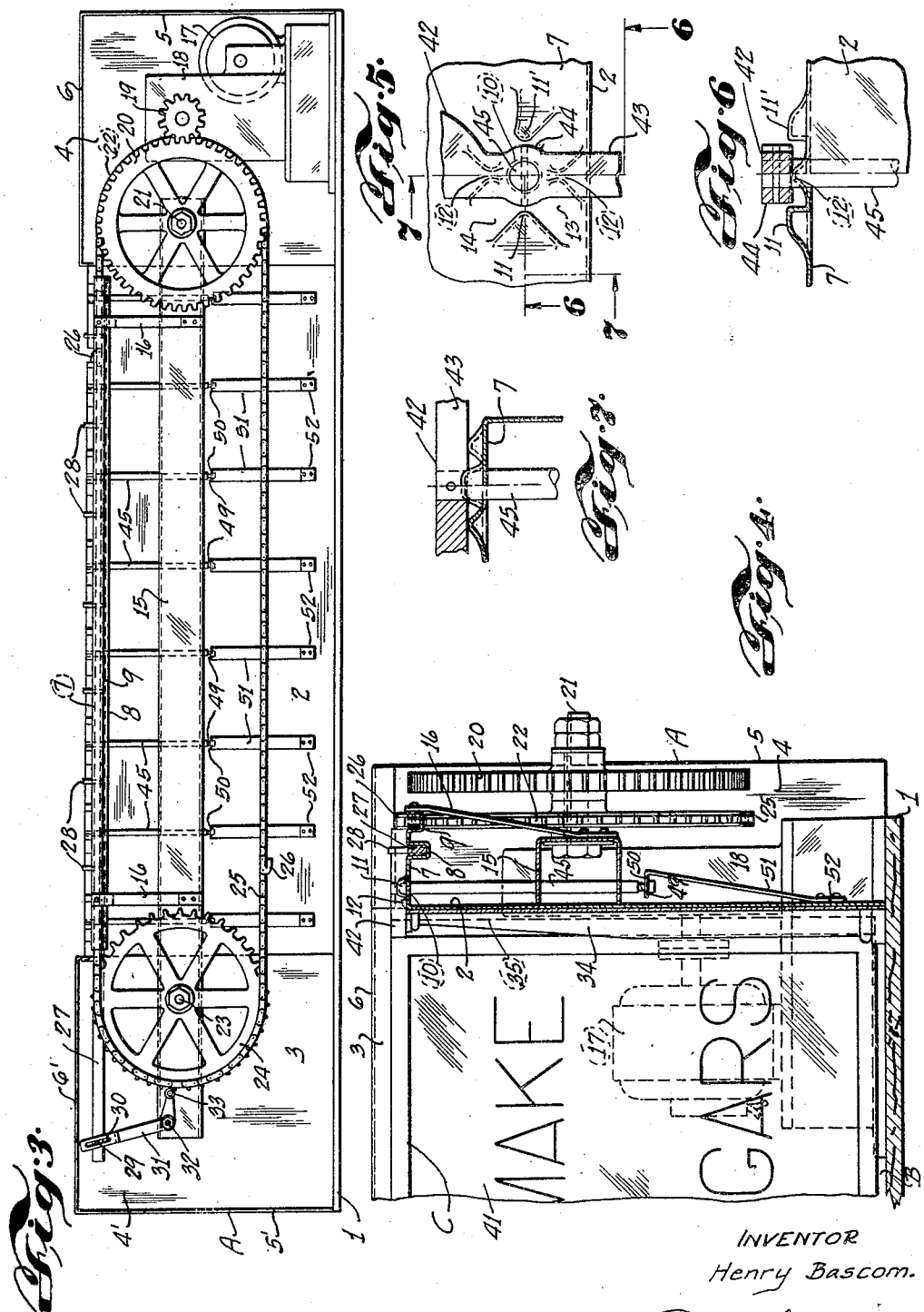
INVENTOR
Henry Bascom.
By Ralph Kalish
ATTORNEY Feb. 28, 1933.  H. BASCOM  1,899,074
DISPLAY APPARATUS
Filed Nov. 14, 1931   4 Sheets-Sheet 3
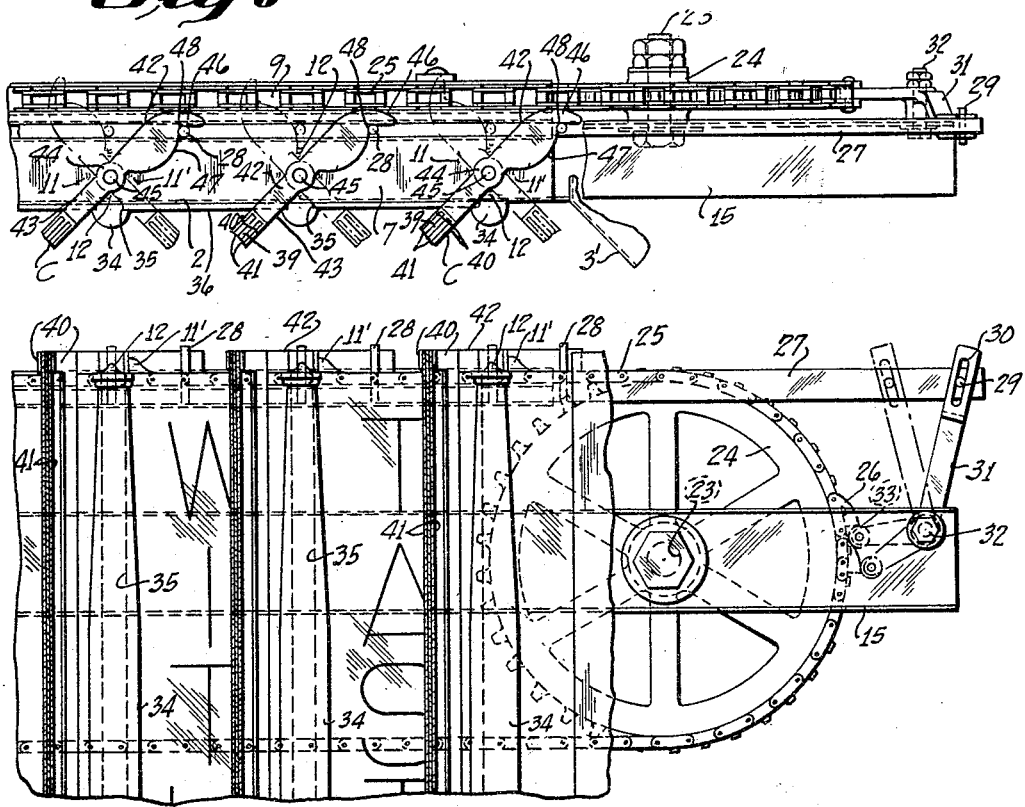
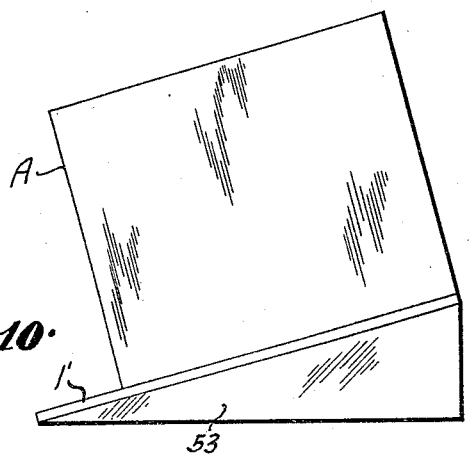
INVENTOR
Henry Bascom.
By Ralph Kalish
ATTORNEY

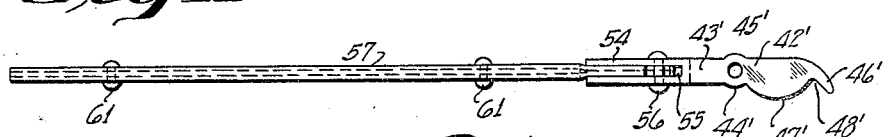
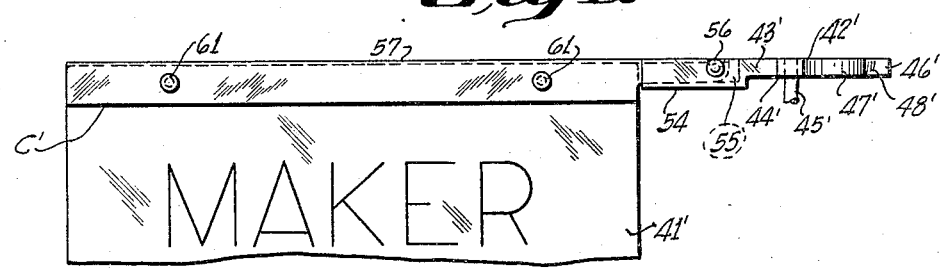
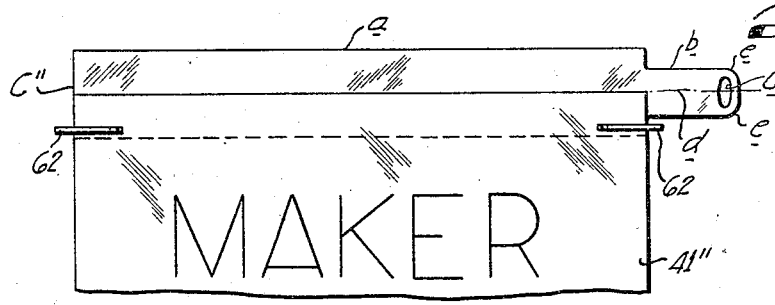
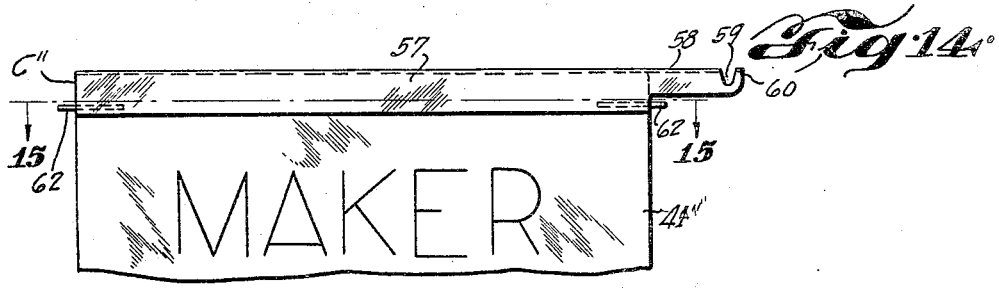
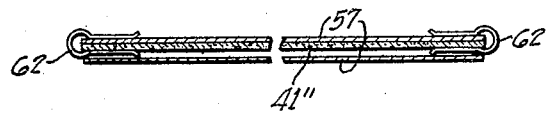

Patented Feb. 28, 1933

1,899,074

UNITED STATES PATENT OFFICE

HENRY BASCOM, OF ST. LOUIS, MISSOURI, ASSIGNOR OF THIRTY PER CENT TO ROY FRED TOELKE, OF ST. LOUIS, MISSOURI

DISPLAY APPARATUS

Application filed November 14, 1931. Serial No. 575,009.

This invention relates generally to display apparatus and has more particular reference to display apparatus of the oscillatory wing type.

My invention has for an object the provision of a display apparatus including a plurality of pivotally mounted wings normally arranged obliquely in a row in overlapping spaced relation, and means for folding the wings into oppositely oblique overlapping spaced relation for splaying the wings in pairs successively along the row.

My invention has for another object the provision, in such described display apparatus, of back-ground providing means having portions for successive exposure at the apex of the angle between the respective splayed pairs of wings.

My invention has for still another object the provision of a display apparatus of the type stated incorporating a unique wing-actuating mechanism for intermittently swinging the wings for successively obverting their aspect and for thereafter simultaneously reverting all the wings to their former position.

My invention has for a further object the provision of a display apparatus of the type stated comprising a series of pivotally mounted wings and a support therefor having wing-co-operating latching means for retaining the wings releasably in oppositely swung positions.

My invention has for a still further object the provision of a display apparatus of the type stated comprising a series of pivotally mounted wings each including a pintle and a support having pintle-co-operating means for detachably retaining the pintle in wing-oscillatory position.

And with the above and other objects in view, my invention resides in the novel features of form, construction, arrangement and combination of parts hereinafter described and pointed out in the claims.

In the accompanying drawings (four sheets),—

Figure 1 is a top plan view of a display apparatus of my invention;

Figure 2 is a front elevational view of the apparatus;

Figure 3 is a rear elevational view of the apparatus;

Figure 4 is an enlarged sectional view of the apparatus, taken approximately along the line 4—4, Figure 1;

Figure 5 is an enlarged fragmentary top plan view of a portion of the wing support, showing a part of a wing-carrying arm and means carried by the support for latching co-operation with the arm;

Figure 6 is a fragmentary sectional view taken approximately along the line 6—6, Figure 5;

Figure 7 is a fragmentary sectional view taken approximately along the line 7—7, Figure 5;

Figure 8 is an enlarged fragmentary broken top-plan view of an end of the apparatus, showing the wing-reverting mechanism, portions of the wings being shown by solid lines in obverted positions and by dot-dash lines in reverted positions;

Figure 9 is a fragmentary front view, partly broken away and in section, of the mechanism shown in Figure 8;

Figure 10 is a side elevational view of a modified form of the device providing for sub-level visibility thereof;

Figure 11 is a top-plan view of a modified form of wing construction including a wing-arm and a card-carrying holder separably attached to the arm, the holder comprising a strip of folded material, and an indicia-carrying card attached to the holder between the folded portions thereof;

Figure 12 is a fragmentary side view of the upper part of the wing-construction of Figure 11;

Figure 13 is a side view of the card-carrying holder in unfolded or expanded position, a fragmentary portion of the card being shown, the latter in this case, however, being merely clipped or releasably attached to the holder;

Figure 14 is a view similar to Figure 13, the holder being folded on the card; and Figure 15 is a sectional view taken approximately along the line 15—15, Figure 14.

Referring now more in detail and by reference characters to the drawings, which illustrate a preferred embodiment of my invention, A designates a casing or housing providing a display chamber B open at its front and top sides, the casing A including a base-member 1 forming in part the bottom wall of the chamber B.

Centrally upstanding from and adjacent the rear margin of the base 1, is a chamber back-wall 2, the sides of the chamber B being formed by splayed walls 3, 3', also upstanding from the base 1 and extending diagonally from the opposite ends of the back-wall 2 forwardly to the respective side margins of the base 1 a suitable distance rearwardly of the front edge of the base, as best seen in Figure 1.

At the opposite rear corners of the base 1, are box-like enclosures 4, 4', respectively, open at their rear sides and formed each by the respective splay-wall 3, 3', as the case may be, and also respective casing end-walls 5, 5', upstanding from the adjacent side-margins of the base 1 and joined to the front edge of the adjacent splay-wall for extending beyond the rearward margin of the base 1, triangular top-walls 6, 6' suitably enclosing the space between the splay-and end-walls 3, 5, and 3', 5', respectively.

Rearwardly projecting from the top-margin of the back wall 2, is a longitudinal shelf or wing-support 7 having its rear margin folded or bent in channel-like manner to provide a pair of front and rear longitudinal depending ways 8, 9, respectively, parallel with each other and with the back-wall 2.

Provided in the front or wall-adjacent margin of the wing-support 7, is a series of spaced pintle-apertures 10, each aperture-marginal portion of the plate 7 being suitably bent, pressed, or otherwise formed, providing plate upraised abruptly-sided noses or stops 11, 11', diametrically opposed on the longitudinal axis of the particular aperture 10 and other plate upraised slopingly-sided cams or lifts 12 diametrically opposed on the transverse axis of the aperture 10, a pair of diagonally disposed ways or channels 13, 14, being thus formed between the opposing sides of the respective pairs of stops 11, 11', and lifts 12, and the ways 13, 14, intersecting at the axis of the pintle-aperture 10, as clearly seen in Figures 5, 6, and 7.

Mounted on the rear face of, and projecting rearwardly from, the back wall 2, is a hollow-frame member or box-girder 15 spaced downwardly from, and disposed longitudinally parallel with, the plate or shelf 7, suitable brackets 16 being attached to and extending between the rear walls, respectively, of the box-girder 15 and rear way 9 for supporting the rear margin of the plate 7, the opposite ends of the girder 15 being extended beyond the adjacent ends of the wall 2 for projecting into the corner enclosures 4, 4', respectively, as best seen in Figure 3.

Suitably mounted in the enclosure 4, is a motor 17 having operative connection with a suitable speed-reducer 18 or the like, having a pinion 19 meshing with a gear 20 rotarily supported on a stub-shaft 21 projecting rearwardly from the back wall of the end of the box-girder 15 in the enclosure 4. The gear 20 is, in turn, operatively connected with a sprocket 22 also rotarily mounted on the shaft 21 in top-tangential alignment with the rear way 9 of the wing-support 7.

The end of the girder 15 in the enclosure 4' also carries a rearwardly-projecting stub-shaft 23, on which is rotarily mounted a sprocket 24 likewise having top-tangential alignment with the shelf-way 9, and trained over and between the sprockets 22, 24, for slidingly engaging its top strand in the way 9, is a link-chain 25 having a pair of equally spaced link-carried dogs 26, as best seen in Figure 3.

Reciprocable in the way 8, is a shifter-bar 27 carrying a plurality or series of upstanding shifter-pins 28 equal in number and spacing to the pintle apertures 10, for purposes presently appearing. The shifter-bar 27 projects from the way 8 into the enclosure 4' and is provided at its end with a transverse pin 29 working in a slot 30 provided in the vertical arm of a bell-crank 31 pivotally supported, as at 32, on the adjacent end of the box-girder 15.

The horizontal arm of the bell-crank 31 is presented towards the sprocket 24 and carries a pair of rollers 33 for engagement by the chain-dogs 26 as the latter traverse the periphery of the sprocket 24, for shifting the bar 27 in the way 8 towards the enclosure 4, as best seen in Figure 9, the bar 27 being subsequently returned to initial position in a manner presently appearing.

Upstandingly engaged with the front face of the back-wall 2, each opposite one of the pintle apertures 10, is a series of horizontally spaced vertical pilasters or like ornamental frame members 34, each vertically grooved on its opposite-side faces providing, in cooperation with the wall 2, suitable card-receptive channels 35 for slidably receiving the edges of advertising-leaves or cards 36 topwise inserted between each pair of the pilasters 34.

Also mounted on the splay-walls 3, 3', are rectangular, centrally apertured frames 37, 37', respectively having at their sides and bottom card-receptive grooves open at their tops for reception of also respective leaves or cards 38, 38', slidably inserted top-wise into the frames 37, 37', for purposes presently appearing.

Arranged for swingable actuation in the chamber B, each about one of the pintle apertures 10 as an axis, is a series of rectangular leaf-holding wings C, each comprising a vertical web member 39 flanged on its sides and bottom and having on each face of the wing C suitable card-retaining apertured frames 40 providing card-receptive grooves open at their top-side for slidably receiving the edges of advertising-leaves or cards 41 for exposure thereof through the frame-aperture. At their rear flanges, the wings C are preferably brought as near as practicable to the corresponding pilaster 34 for swinging from one side to the other thereof, for exposing one or the other of the cards 36 engaged by that particular pilaster, as best seen in Figure 2.

Rearwardly extending from the top margin of each wing C, is an uncinate arm 42, which includes a frame-connected shank 43 having an intermediate hub 44, in which latter is mounted a depending pintle-shaft 45 having rotative co-operation with the pintle-aperture 10. The shank 43 is adapted for residing alternately in the aperture-adjacent ways 13, 14, on swinging actuation of its carried wing C for exposing, as may be said, the reverse face of the wing when the shank is in the way 13 and for contrariwise exposing the obverse face of the wing when the shank resides in the way 14, as will presently more particularly appear.

The uncinate arm 42 comprises a bill 46 whose convex side provides a cam having wiping co-operation with the chain-dog 26 for lateral movement of the bill 46 from the course of the chain 25 for swinging or obverting the arm-carried wing C from reverse presenting position, as indicated by dot-dash lines in Figure 8, to obverse presenting position, as shown by the full lines of Figure 8.

On its concave side, the arm 42 is provided with an arcuate cam-lobe 47 merging throatwise into the bill 46 with a re-entrant pocket 48 for reception of the particular slide-bar-pin 28 for impinging the under-side of the bill 46 therewith on obverse-presenting movement of the wing C, as best seen in Figure 8.

The pintle 45 depends through the aperture 10 and rotarily passes through, for pilot-bearing co-operation with, the top and bottom walls of the girder 15. The pendant end of the pintle 45 is provided with an annular channel or groove 49, in which is laterally engaged a suitably bifurcated end 50 of a resilient-latch-bar or spring 51 suitably obliquely-upstandingly attached, as at 52, to the rear-face of the wall 2 for detachably retaining the pintle 45 in position, as best seen in Figure 4.

In use and operation, assume first that the wings C are all swung on their pintles 45 to reverted position obliquely toward the chamber-splay wall 3' with the frame-arms 42 overlapping the chain-way 9, the shift-bar 27 at such time, for reasons soon appearing, residing in extreme left-hand shifted position in the way 8 with the bar-carried pins 28 in engagement with the respective cam-lobes 47 of the several frame-arms 42.

The wing C adjacent the opposite splay-wall 3 will then be widely spaced or splayed therefrom for visually presenting from the front of the apparatus in rearwardly converging or V-shaped manner the card 38 in the frame 37 on the splay wall 3 and the card 41 on the reverse face, as may be said, of the wall-adjacent wing C.

The motor 17 being suitably motivated, the chain 25 is actuated for travelling in the way 9 for traversing the dog 26 from left to right (considering Figures 1 and 2) across the wing-support 7 for successively engaging the ends of the arms 42 for laterally-shifting the same from the path of the dog 26 and thus swinging the wings C one at a time or sequentially from reverted to obverted position.

Thus, considering the said end wing C adjacent the wall 3, initial engagement of the dog 26 with the arm 42 swings the latter for riding its shank 43 upon the cams 11, thus releasably lifting the arm 42 out of the way 14 for, in turn, dropping the arm 42 into the way 13 on completion of the wing-swinging movement, the wing C being meanwhile turned through an angle and latched in such oppositely folded position for visually presenting the card 41 on the obverse face of the wing, as seen in Figure 1.

Meanwhile the lateral swinging movement of the arm 42 of the end-wing C causes the cam-lobe 47 to co-act with its engaged pin 28 for longitudinally shifting the bar 27 in its way 8 to extreme right-hand position, this particular pin 28 lodging in the throat 48 of the bill 46 of the arm 42 of the particular wing C, and all the other pins 28 on the bar 27 hence departing from their respectively adjacent arms 42 of the remaining or unobverted wings C of the series, as will be understood also from Figure 1.

The end wing C now resides in overlapping relation with the splay-wall 3 for substantially concealing from view the wall-carried card 38, and in its place there is now visually presented the card 41 on the obverse face, as may be said, of the end wing C, while also exposing or visually presenting the card 41 of the reverse face, as may again be said, of the next adjacent wing C, the back-wall card 36 appearing as a back-ground to and between the opposingly splayed cards 41 of the thus swung-apart particular pair of the wings C, as best seen in Figure 2.

Inasmuch as the chain 25 has preferably a uniform motion, a certain interval will elapse from the time the dog 26 disengages the arm 42 of the one wing C until it engages the arm 42 of the next successive wing C; thus the wings C are intermittently turned or revertingly actuated in sequence from one end of the row to the other, each frame-arm 42, in turn, being again engaged with its corresponding shifter-pin 28 until the last wing C adjacent the wall 3' has been thus turned or folded therefrom, the dog-carrying portion of the chain 25 then entering upon the sprocket 24 for passage of the dog 26 therearound, as best seen in Figure 8.

Meanwhile, the before described righthand shifting movement of the shifter-bar 27 causes the roller-carrying end of the bellcrank 31 to assume a sprocket-adjacent position for engagement of its rollers 33 by the sprocket-moved dog 26, as shown by dotted lines in Figure 9, for swinging the bell-crank 31 until the rollers 33 clear the dog 26. On such movement of the bell-crank 31, the crank-connected shifter-bar 27 is correspondingly shifted in its way 8 to extreme left-hand position, the shifter-pins 28 engaging the lobes 47 of the respective arms 42 for simultaneously reverting all the wings C to their initial or first-described position, as seen in dot-dash lines in Figure 9, for repetition of the wing-obverting sequence.

Continued movement of the chain 25 now brings the other one of the dogs 26 into the chain-way 9 for again obverting the wings C one by one as described, the cycle being thus performed repetitively or recurrently as long as the apparatus is in operation.

Figure 10 illustrates a modified form of base 1', which includes suitable wedge-shaped members 53 attached to the underside of the base 1' for tilting the apparatus frontwise and downwardly, so as to enable the advertising to be seen and read by a person standing below the level of the apparatus, the structural features of the apparatus being otherwise as described.

Figures 11 and 12 illustrate a modified form of wing-construction C', wherein is provided an uncinate arm 42' having a bill 46', cam-lobe 47', pocket 48', pintle-hub 44', and pintle 45', all similar in form and purpose to the like parts hereinbefore described.

The shank 43, of the arm 42' carries a suitably channeled extension 54 providing a blade-receptive way 55, the extension 54 carrying a pin or stop 56 spanning the way 55 adjacent its inner end.

The wing C' includes a holder 57 composed of a blank a of preferably light-weight or readily foldable metallic material, as tinplate or the like, the blank a having a narrowed tongue or reduced extension b, in the end of which is formed a transversely oblong aperture c, a score-line d longitudinally bisecting the blank a and aperture c, the endcorners of the tongue b being suitably rounded as shown at e, as best seen in Figure 13.

On folding the blank a along the scoreline d, the holder 57 takes the shape best seen in Figure 14, the tongue b now providing a blade 58 of less width than, and projecting from, the holder 57, the aperture c providing a notch 59, and the rounded blade corners e providing a bill 60 bounding the notch 59 and forming the end of the blade 58.

Between the folded lips of the holder 57 is inserted the top-margin of the indicia-bearing card 41', which is permanently secured or attachingly riveted, as at 61, to the holder 57 to form the wing C', as will be clearly understood from Figures 11 and 12. Or, the card, as 41", may be releasably attached to, and at the opposite ends of, the holder 57 by means of suitable U-shaped clips 62 of resilient metal or the like, forming the wing C", as clearly shown in Figures 13, 14, and 15.

In either case, the blade or tongue 58 is inserted into the arm-way 55, the holder 57 being suitably canted or inclined for passing the bill 60 under the way-pin 56 for engaging the latter in the blade-notch 59 for thereby effectively positioning and locking the blade 58 in the way 55 for supporting the holder 57 and its carried card 41' or 41" by and from the arm 42'.

By such construction, it will be seen that, the holder 57 may with ease and facility be readily detached from or attached to, the arm 42' without necessitating the removal of the latter from its support.

In the practical use of my invention, it will be understood that the user may from time to time be supplied by the manufacturer with new sets of the cards 48, 41', or 41", as the case may be for replacing the old set in the machine for providing a changeable, up-to-date and attention-compelling display of advertising matter having suitable relation to matters of current interest, as newsmatter, seasonal sales or the like.

Such replacement sets of the cards, as 41, in the preferred embodiment of the invention, may be readily inserted in the frames C after first removing the old set, as will be readily understood.

However, when employing the modified form of wing C' shown in Figures 11 and 12, the cards 41' being provided each with its permanently attached holder 57, the user merely removes the old set of wings C' and replaces them with the new wings, the operation being simply accomplished with minimum loss of time.

However, again, when employing the modified form of wing C", as shown in Figures 13, 14, 15, the cards 41" being furnished without the holders 57, and assuming the machine has been originally equipped with holders 57 and clips 62, the user merely removes the blades 57 from the machine, detaches the old cards from the blades, and in turn attaches the new cards 41" to the blades, the latter being then replaced in the machine.

My invention provides a unique and attention-attracting advertising apparatus highly effective for its intended purpose, simple and reliable in operation, and inexpensive in construction and maintenance. The character of indicia or advertising matter may, of course, be words, signs, figures, pictures, and the like, as may best serve to advertise the user's wares or to attract attention to an associated display of merchandise or the like.

It will be understood that changes and modifications in the form, construction, arrangement, and combination of the several parts of the apparatus may be made and substituted for those herein shown and described without departing from the nature and principle of my invention.

Having thus described my invention, what I claim and desire to secure by Letters Patent is—

1. In a display apparatus, in combination, a plurality of pivotally mounted wings normally arranged obliquely in a row in overlapping spaced relation, means for folding the wings into oppositely oblique overlapping spaced relation for splaying the wings in pairs successively along the row, and means providing a back-ground for visual presentation between the splayed wings of the successive pairs thereof.

2. In a display apparatus, in combination, a display chamber, wings swingable in the chamber, means for splaying the wings in pairs successively across the chamber, and means including a wall of the chamber having portions providing a back-ground for visual presentation between the splayed wings of the successive pairs thereof.

3. In a display apparatus, in combination, a support, a series of wings, means including arms on the wings and pintles on the arms having rotative engagement with the support for oscillation of the wings thereon, and means including members on the support providing ways intersecting at the respective pintles for engagement by the arms for releasably retaining the wings in oppositely swung positions.

4. In a display apparatus, in combination, a support, wings mounted for oscillation on the support, means including arms on the wings and a support-traversing member engageable in succession with said arms for sequentially swinging the wings from one position to another, and means including a shifter-bar actuable by said member at the conclusion of its traverse in one direction for restoring the wings to initial positions.

5. In a display apparatus, in combination, a support, wings mounted for oscillation on the support and each having an arm, means including a continuously motivated chain and an arm-impinging member carried by the chain for recurrently traversing the support for swinging the wings in one direction, and means for restoring the wings to initial positions for recurrent engagement by said member.

6. In a display apparatus, in combination, a support having ways, wings mounted for oscillation on the support, arms on the wings overhanging said ways, a member traversing one of said ways for shifting the arms to a side thereof for swinging the wings successively from one position to another, and a member shiftable in the other of said ways for co-operation with the side-shifted arms for restoring the wings to initial position.

7. In a display apparatus, in combination, a support having ways, wings mounted for oscillation on the support, arms on the wings overhanging said ways, a chain-carried dog traversing one of said ways for successively shifting the arms to a side thereof for swinging the wings from one position to another, a bar shiftable in the other of said ways having pins for engagement by the dog-shifted arms, and means actuable by the dog after its arm-shifting traverse for shifting the bar for restoring the wings to initial positions.

8. In a display apparatus, in combination, a support, a longitudinal series of oscillatory wings on the support swingable for residing in oppositely overlapping folded positions, arms on the wings swingable over the support, sprockets tangentially aligned with the support at the respective ends thereof, a continuous chain trained over the sprockets for travelling its one strand over the support, dogs carried by the chain for recurrently traversing the support for successively engaging said arms for sequentially swinging the wings from overlapping position in one direction to contrariwise overlapping position in the other position, and means for simultaneously restoring the wings to initial position after each wing-swinging traverse of the dogs.

9. In a display apparatus, in combination, a support, a dog for traversing said support in one direction, a pin carrying-bar shiftable on the support in the other direction, and a series of support-carried oscillatory wings each including an uncinate arm having a bill and a lobe merging thereinto, the back of the bill being engageable by the dog for swinging the wing in one direction and the lobe being engageable by a bar-carried pin for restoring the wing to initial position.

10. In a display apparatus, in combination, a support, oscillatory wings on the support, a support-traversing member co-operable in succession with the wings for sequentially swinging the same from one position to another, and means including a wing-co-operating bar shiftable on the support and a bell-crank co-operating with said bar for actuation by said member at the conclusion of the traverse for restoring the wings to initial position.

11. In a display apparatus, in combination, a display chamber including a back-wall and splayed side walls, and a plurality of oscillatory wings supported in the chamber for residing in alternate overlapping positions obliquely toward one or the other of the splayed side-walls.

12. In a display apparatus, in combination, a display-chamber including a back-wall, a wing-support including a member projecting from the top of the back-wall having a series of pintle receptive apertures, a series of rectangular wings including rearwardly projecting arms having pintles engaging said apertures, and means for releasably engaging the pintles for retaining the same in the support.

13. Display apparatus comprising, in combination, a support, an arm pivotally mounted on the support, a card-carrying holder separably attached to the arm, said holder comprising a strip of folded material, and an indicia bearing card attached to the holder between the folded portions thereof.

14. Display apparatus comprising, in combination, a support, an arm pivotally mounted on the support, said arm having a way and a stop therein, and a card-carrying holder having a blade for engaging the way, said blade including a bill providing a notch for engaging the stop for detachably securing the holder to the arm.

15. In a display apparatus, in combination, a frame, a series of wings hinged in a rectilinear row to the frame for oscillation, means including a continuously moving member for shifting the wings sequentially in one direction, and means including an intermittently movable member for swinging the wings simultaneously in the opposite direction.

16. In a display apparatus, in combination, a frame, a series of wings hinged in a rectilinear row to the frame for oscillation, and means for releasably retaining the wings in oppositely swung oblique positions relatively to the support, said means including spaced pairs of opposed stops on the frame and arms on the wings engageable with the pairs of stops.

17. In a display apparatus, in combination, a frame, a series of wings hinged in a rectilinear row to the frame for oscillation, and means for releasably retaining the wings in oppositely swung oblique positions relatively to the support, said means including members providing intersecting diagonal ways on the frame and arms on the wings for alternate disposition in said ways.

18. In a display apparatus, a support, a slotted arm mounted for oscillation on the support, a pin fixed in the arm and extending across said slot, a holder, a hook on the holder for disposition in said slot for detachable engagement with said pin, and an indicia-bearing card carried by the holder.

In testimony whereof, I have signed my name to this specification.

HENRY BASCOM.